United States Patent
Hoover et al.

(10) Patent No.: US 10,157,539 B1
(45) Date of Patent: Dec. 18, 2018

(54) TECHNIQUES AND APPARATUSES FOR PRIORITIZING VEHICLE-TO-EVERYTHING (V2X) COMMUNICATION MESSAGES BASED ON THREAT LEVEL ESTIMATION

(71) Applicant: QUALCOMM Incorporated, San Diego, CA (US)

(72) Inventors: Scott Hoover, Del Mar, CA (US); Arvind Santhanam, San Diego, CA (US); Feng Lu, Santa Clara, CA (US); Hongsan Sheng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/801,047

(22) Filed: Nov. 1, 2017

(51) Int. Cl.
*G08G 1/00* (2006.01)
*G08G 1/01* (2006.01)
*H04W 4/70* (2018.01)
*H04L 29/08* (2006.01)

(52) U.S. Cl.
CPC ............ *G08G 1/0112* (2013.01); *H04W 4/70* (2018.02); *H04L 67/12* (2013.01)

(58) Field of Classification Search
USPC .................................................. 701/117–119
See application file for complete search history.

(56) References Cited

U.S. PATENT DOCUMENTS

| | | | |
|---|---|---|---|
| 6,442,484 B1 * | 8/2002 | Miller | B60R 21/0134 340/990 |
| 8,395,529 B2 * | 3/2013 | Seder | G01S 13/723 340/905 |
| 9,317,983 B2 * | 4/2016 | Ricci | H04W 4/21 |
| 9,552,727 B2 * | 1/2017 | Rubin | G08G 9/02 |
| 2002/0072963 A1 * | 6/2002 | Jonge | G07B 15/02 705/13 |
| 2003/0139881 A1 * | 7/2003 | Miller | B60R 21/013 701/301 |
| 2010/0198513 A1 * | 8/2010 | Zeng | B60W 40/02 701/300 |
| 2010/0253594 A1 * | 10/2010 | Szczerba | G01S 13/723 345/7 |
| 2010/0289632 A1 * | 11/2010 | Seder | G01S 13/723 340/436 |
| 2010/0292886 A1 * | 11/2010 | Szczerba | G01C 21/365 701/31.4 |
| 2011/0140968 A1 * | 6/2011 | Bai | G01S 5/0072 342/454 |

(Continued)

FOREIGN PATENT DOCUMENTS

| | | |
|---|---|---|
| WO | WO-2016177397 A1 | 11/2016 |
| WO | WO-2017134578 A1 | 8/2017 |

*Primary Examiner* — Jonathan L Sample
(74) *Attorney, Agent, or Firm* — Harrity & Harrity, LLP (57) ABSTRACT

Certain aspects of the present disclosure generally relate to wireless communication. In some aspects, a user equipment may receive sidelink control information (SCI) associated with a remote vehicle; identify a threat metric associated with the remote vehicle based at least in part on one or more characteristics of the remote vehicle, wherein the one or more characteristics are determined based at least in part on vehicle information received in one or more transport blocks corresponding to prior SCI associated with the remote vehicle and received prior to the SCI; and process the SCI based at least in part on the threat metric. Numerous other aspects are provided.

30 Claims, 6 Drawing Sheets

(56) References Cited

U.S. PATENT DOCUMENTS

| | | | |
|---|---|---|---|
| 2012/0091259 A1* | 4/2012 | Morris | B64C 27/02 244/17.13 |
| 2012/0093357 A1* | 4/2012 | Seder | B60W 30/095 382/103 |
| 2012/0169513 A1* | 7/2012 | Szczerba | G02B 27/01 340/905 |
| 2012/0188098 A1* | 7/2012 | Mochizuki | G08G 1/096783 340/905 |
| 2014/0032053 A1* | 1/2014 | Mochizuki | G08G 1/161 701/45 |
| 2014/0306799 A1* | 10/2014 | Ricci | H04W 4/21 340/5.83 |
| 2014/0306826 A1* | 10/2014 | Ricci | H04W 4/21 340/573.1 |
| 2016/0133130 A1* | 5/2016 | Grimm | H04L 67/22 340/905 |
| 2016/0133131 A1* | 5/2016 | Grimm | B60W 40/068 701/117 |
| 2016/0295624 A1* | 10/2016 | Novlan | H04W 76/14 |
| 2017/0048903 A1* | 2/2017 | Yi | H04W 72/02 |
| 2017/0113665 A1* | 4/2017 | Mudalige | G08G 1/166 |
| 2017/0132477 A1* | 5/2017 | Kim | G06K 9/00791 |
| 2017/0171690 A1* | 6/2017 | Kim | H04W 4/00 |
| 2017/0188391 A1* | 6/2017 | Rajagopal | H04W 74/0816 |
| 2017/0230385 A1* | 8/2017 | Ruvio | H04L 63/1416 |
| 2017/0268896 A1* | 9/2017 | Bai | G01C 21/36 |
| 2017/0289733 A1* | 10/2017 | Rajagopal | H04W 4/70 |
| 2017/0289935 A1* | 10/2017 | Yoon | G01S 19/13 |
| 2017/0295579 A1* | 10/2017 | Sheng | H04W 72/02 |
| 2017/0332352 A1* | 11/2017 | Sheng | H04L 67/12 |
| 2017/0353819 A1* | 12/2017 | Yin | H04L 47/30 |
| 2018/0041863 A1* | 2/2018 | Taylor | G08G 1/005 |
| 2018/0042023 A1* | 2/2018 | Sheng | H04W 4/046 |
| 2018/0049220 A1* | 2/2018 | Patil | H04W 72/0426 |
| 2018/0075746 A1* | 3/2018 | Jiang | G08G 1/096791 |
| 2018/0077518 A1* | 3/2018 | Nguyen | H04W 4/70 |
| 2018/0220418 A1* | 8/2018 | Baghel | H04W 72/0446 |

* cited by examiner

TECHNIQUES AND APPARATUSES FOR PRIORITIZING VEHICLE-TO-EVERYTHING (V2X) COMMUNICATION MESSAGES BASED ON THREAT LEVEL ESTIMATION

TECHNICAL FIELD

Aspects of the present disclosure generally relate to wireless communication, and more particularly to techniques and apparatuses for prioritizing vehicle-to-everything (V2X) communication messages based at least in part on threat level estimation. Embodiments enable and provide techniques providing a variety of threat detection abilities and features to prioritize communications at least partially based on a variety of threat consideration scenarios.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects, a method of wireless communication may be performed by a user equipment (UE). The method may include receiving sidelink control information (SCI) associated with a remote vehicle; identifying a threat metric associated with the remote vehicle based at least in part on one or more characteristics of the remote vehicle, wherein the one or more characteristics are determined based at least in part on vehicle information received in one or more transport blocks corresponding to prior SCI associated with the remote vehicle and received prior to the SCI; and processing the SCI based at least in part on the threat metric.

In some aspects, a user equipment for wireless communication may include memory and one or more processors operatively coupled to the memory. The memory and the one or more processors may be configured to receive sidelink control information (SCI) associated with a remote vehicle; identify a threat metric associated with the remote vehicle based at least in part on one or more characteristics of the remote vehicle, wherein the one or more characteristics are determined based at least in part on vehicle information received in one or more transport blocks corresponding to prior SCI associated with the remote vehicle and received prior to the SCI; and process the SCI based at least in part on the threat metric.

In some aspects, a non-transitory computer-readable medium may store one or more instructions for wireless communication. The one or more instructions, when executed by one or more processors of a user equipment, may cause the one or more processors to receive sidelink control information (SCI) associated with a remote vehicle; identify a threat metric associated with the remote vehicle based at least in part on one or more characteristics of the remote vehicle, wherein the one or more characteristics are determined based at least in part on vehicle information received in one or more transport blocks corresponding to prior SCI associated with the remote vehicle and received prior to the SCI; and process the SCI based at least in part on the threat metric.

In some aspects, an apparatus for wireless communication may include means for receiving sidelink control information (SCI) associated with a remote vehicle; means for identifying a threat metric associated with the remote vehicle based at least in part on one or more characteristics of the remote vehicle, wherein the one or more characteristics are determined based at least in part on vehicle information received in one or more transport blocks corresponding to prior SCI associated with the remote vehicle and received prior to the SCI; and means for processing the SCI based at least in part on the threat metric.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims. While features of the technology described below may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various circuits, devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 3:
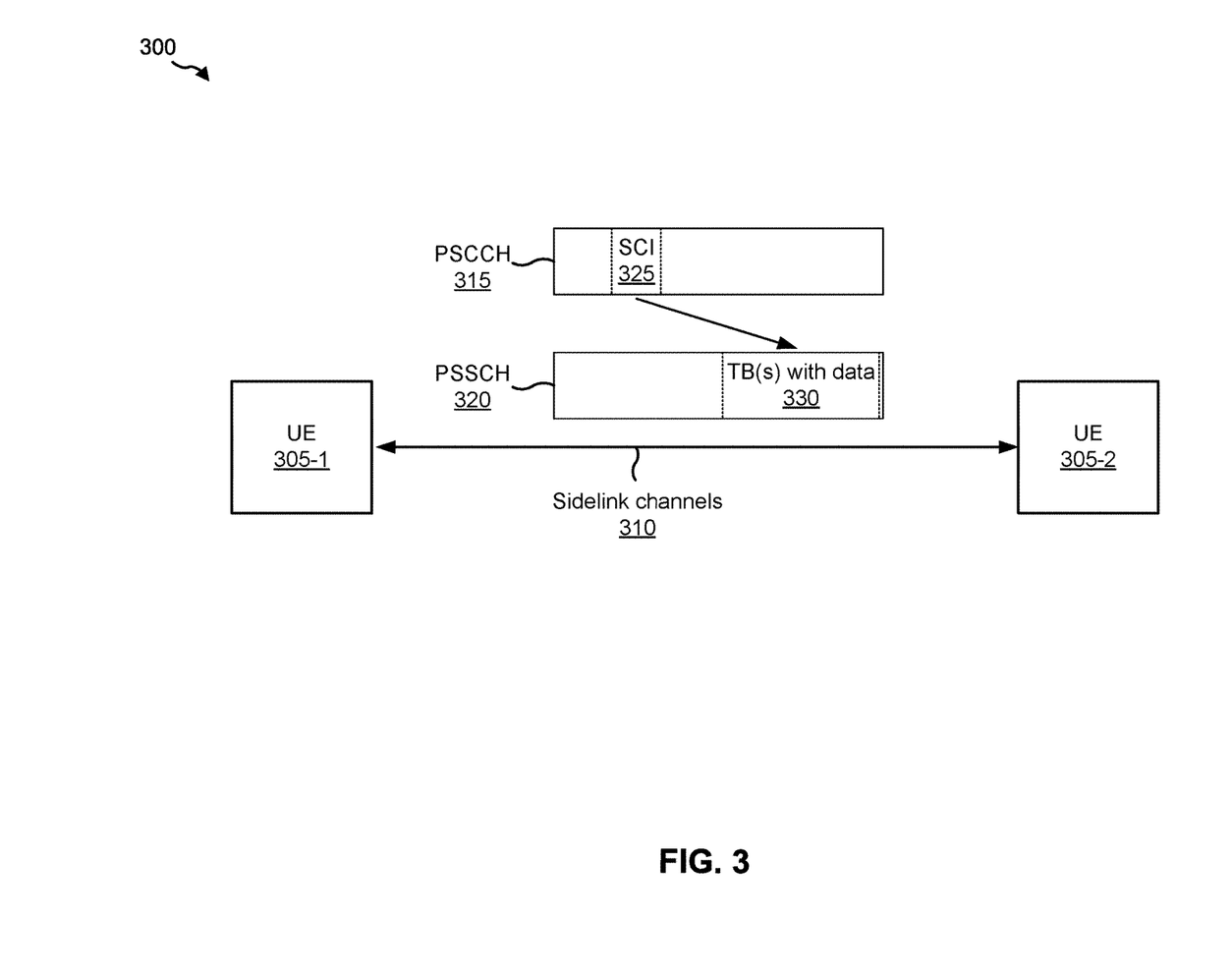
FIG. 3 is a block diagram conceptually illustrating an example of V2X communications via a sidelink, in accordance with certain aspects of the present disclosure.

In V2X communication systems (which are described in more detail elsewhere herein, such as in connection with FIG. 3), UEs associated with vehicles may communicate with one another using device-to-device (D2D) communication via a sidelink channel. The sidelink channel may include a physical sidelink control channel (PSCCH) and a physical sidelink shared channel (PSSCH). The PSCCH may be used to communicate control information, and the PSSCH may be used to communicate data. For example, the PSCCH may carry sidelink control information (SCI), such as SCI 1, which may indicate various control information used for sidelink communications, such as one or more resources (e.g., time, frequency, and/or beam resources) of a transport block (TB) on the PSSCH. The TB may include V2X data, such as data relevant to operation of a vehicle associated with a UE.

In some V2X communication systems, a UE associated with a host vehicle may blindly decode SCIs, received from remote vehicles, at the beginning of each subchannel of the PSCCH, or may arbitrarily or randomly determine SCIs to be initially decoded. Due to the volume of network traffic in the V2X communication system, this may cause more important transmissions (e.g., from a large vehicle that is quickly approaching or swerving, from a vehicle in a blind spot, and/or the like) to be dropped in favor of less important transmissions (e.g., from a vehicle on the opposite side of a divided highway, from a vehicle that is far away, and/or the like) due to processing and power constraints of a UE receiving the transmissions.

Some techniques and apparatuses described herein improve performance of V2X communication systems by permitting a UE associated with a host vehicle to determine threat metrics for V2X traffic received from UEs associated with remote vehicles and prioritizing process of SCIs and corresponding TBs based at least in part on the threat metrics. In this way, the UE of the host vehicle may process more important V2X traffic earlier and/or more often than less important V2X traffic, which increases safety and improves performance and power consumption when the UE of the host vehicle is resource-constrained.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, vehicles, vehicular components, traffic-assistance devices/systems, etc.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with 3G and/or 4G wireless technologies, aspects of the present disclosure can be applied in other generation-based communication systems, such as 5G and later, including NR technologies.

Figure 1:
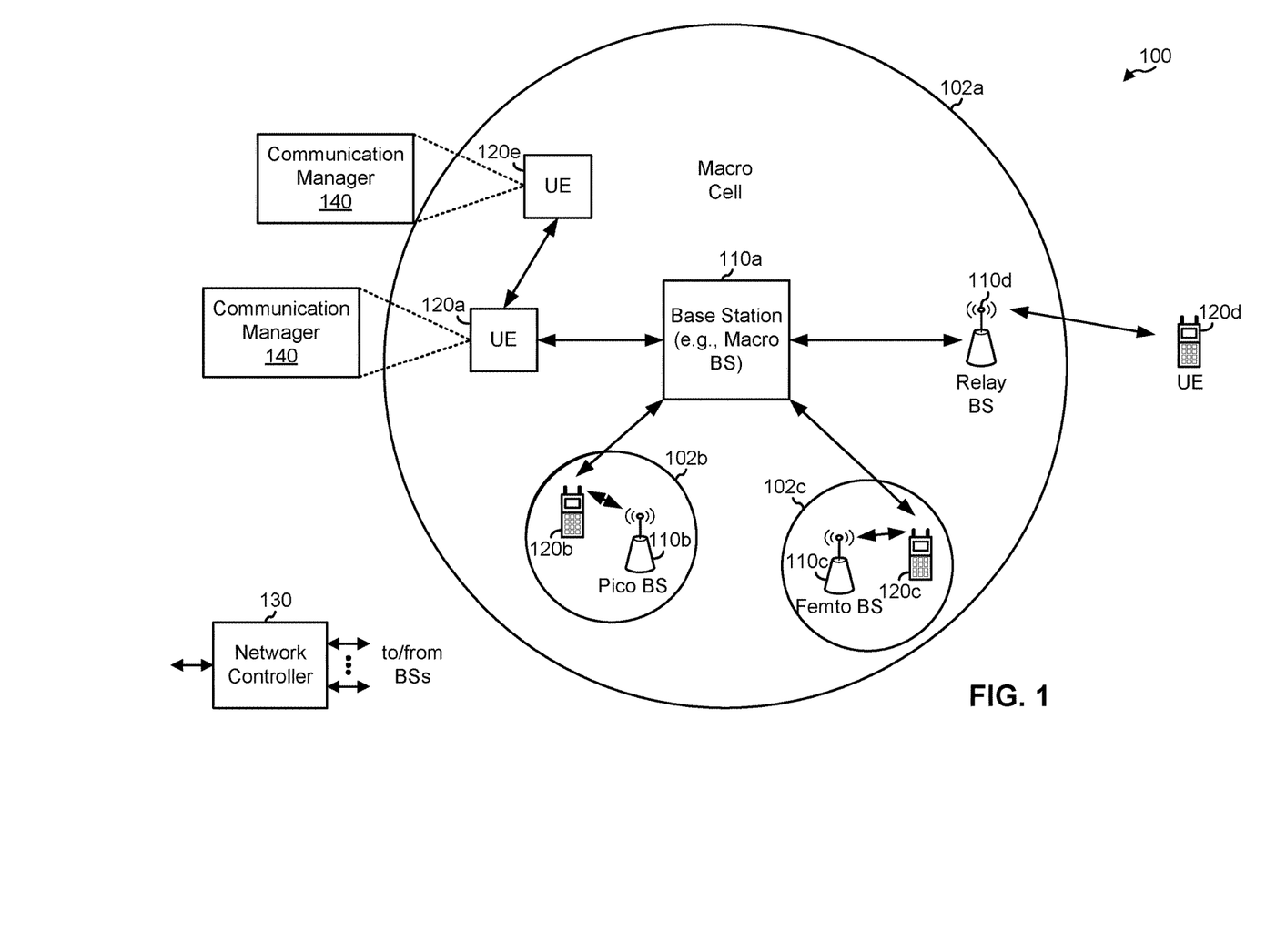
FIG. 1 is a block diagram conceptually illustrating an example of a wireless communication network, in accordance with certain aspects of the present disclosure.

FIG. 1 is a diagram illustrating a network 100 in which aspects of the present disclosure may be practiced. The network 100 may be an LTE network, a 5G or NR network, and/or the like, which may be used to carry V2X communications. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein. Some V2X communication systems may operate using a BS that acts as an intermediary between UEs, and some V2X communication systems may operate without using a BS as an intermediary between UEs, as described in more detail elsewhere herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

In some aspects, a UE 120 may be associated with a vehicle, and may transmit and/or receive V2X communications. For example, a UE 120 may be integrated into the vehicle, may be located inside of the vehicle, may be located on the vehicle, may be associated with a driver of the vehicle, and/or the like.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using a vehicle-to-everything (V2X) protocol, which may include a vehicle-to-vehicle (V2V) protocol, a vehicle-to-infrastructure (V2I) protocol, a vehicle-to-pedestrian (V2P) protocol, and/or the like. In this case, the UE 120 may perform scheduling operations, resource selection operations, and/or other operations described elsewhere herein as being performed by the base station 110. In some aspects, a UE 120 may operate in transmission mode 3, where resource selection and/or scheduling is performed by the base station 110. In some aspects, a UE 120 may operate in transmission mode 4, where resource selection and/or scheduling is performed by the UE 120. Additional details regarding sidelink communications and V2X communications are described below in connection with FIG. 3.

As shown in FIG. 1, the UE 120 may include a communication manager 140. As described in more detail elsewhere herein, the communication manager 140 may receive sidelink control information (SCI) associated with a remote vehicle; may identify a threat metric associated with the remote vehicle based at least in part on one or more characteristics of the remote vehicle, wherein the one or more characteristics are determined based at least in part on vehicle information received in one or more transport blocks corresponding to prior SCI associated with the remote vehicle and received prior to the SCI; and/or may process the SCI based at least in part on the threat metric. Additionally, or alternatively, the communication manager 140 may perform one or more other operations described herein.

As indicated above, FIG. 1 is provided merely as an example. Other examples are possible and may differ from what was described with regard to FIG. 1.

Figure 2:
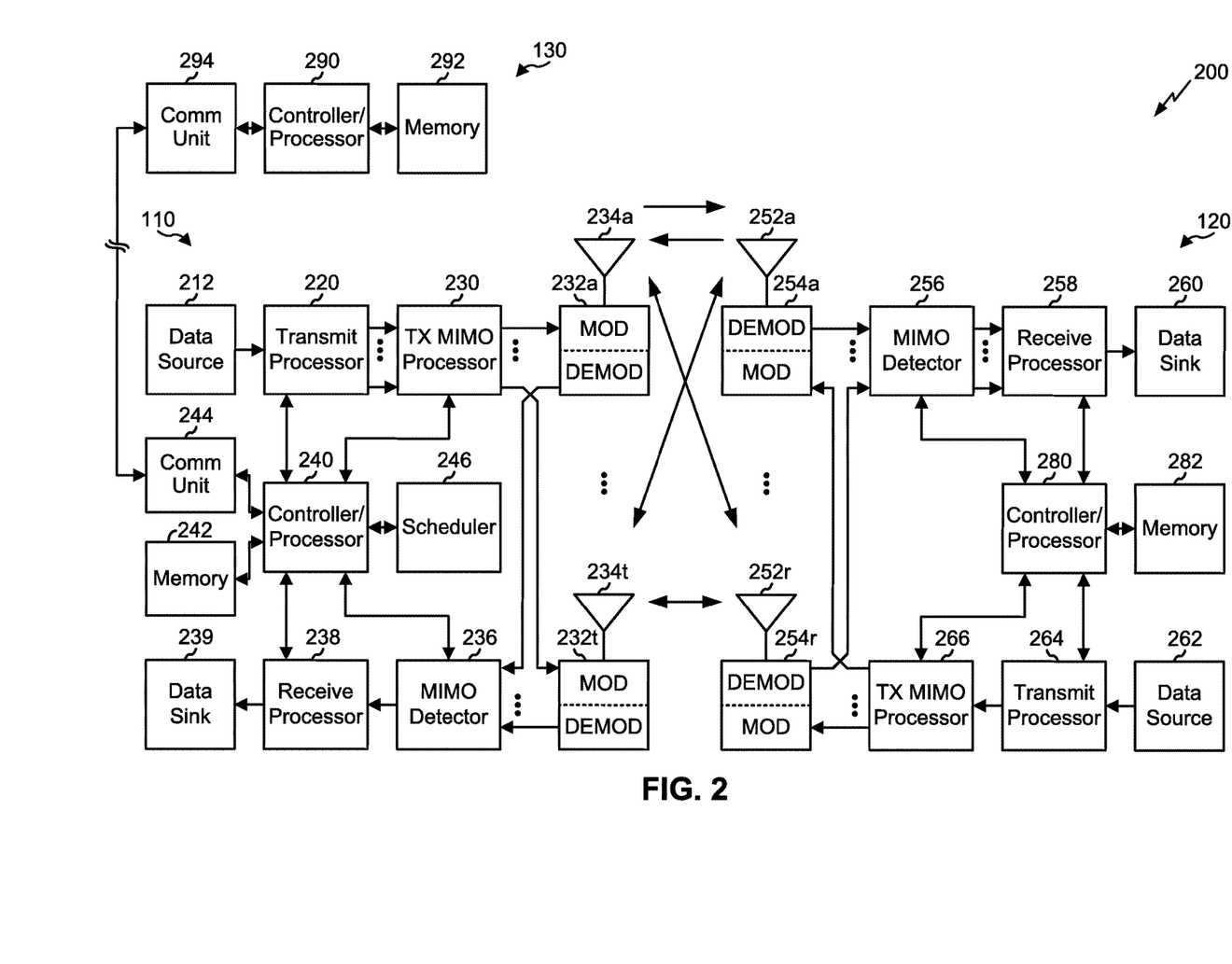
FIG. 2 is a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to certain aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280.

Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Although FIG. 2 illustrates components of a base station 110, a UE 120, and a network controller 130 for completeness, in some aspects, two or more UEs 120 may communicate directly with one another via a sidelink (e.g., without communicating with a base station 110 as an intermediary). In this case, one or more components of the UE 120 may perform one or more operations or functions described herein as being performed by one or more components of the base station 110 (e.g., for scheduling, resource selection, and/or the like). Additional details regarding direct UE-to-UE communications are described below in connection with FIG. 3.

In some aspects, one or more components of UE 120 may be included in a housing. Controller/processor 240 of base station 110, controller/processor 280 of UE 120, and/or any other component(s) of FIG. 2 may perform one or more techniques associated with prioritizing V2X communication messages based at least in part on threat level estimation, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes described herein. Memories 242 and 282 may store data and program codes for base station 110 and UE 120, respectively. A scheduler 246 may schedule UEs for data transmission on the downlink and/or uplink.

In some aspects, the UE 120 may include means for receiving sidelink control information (SCI) associated with a remote vehicle, means for identifying a threat metric associated with the remote vehicle based at least in part on one or more characteristics of the remote vehicle, means for processing the SCI based at least in part on the threat metric, means for modifying a value of the threat metric based at least in part on a change in the one or more characteristics, and/or the like. Additionally, or alternatively, the UE 120 may include means for performing one or more other operations described herein. In some aspects, such means may include the communication manager 140. Additionally, or alternatively, such means may include one or more components of the UE 120 described in connection with FIG. 2.

As indicated above, FIG. 2 is provided merely as an example. Other examples are possible and may differ from what was described with regard to FIG. 2.

FIG. 3 is a block diagram conceptually illustrating an example 300 of V2X communications via a sidelink, in accordance with certain aspects of the present disclosure.

As shown in FIG. 3, a first UE 305-1 may communicate with a second UE 305-2 (and one or more other UEs 305) using device-to-device (D2D) communications via one or more sidelink channels 310. In some aspects, the UEs 305 may correspond to one or more other UEs described elsewhere herein, such as UE 120 and/or the like. In some aspects, the sidelink channel 310 may use a PC5 interface and/or may operate in a high frequency band (e.g., the 5.9 GHz band). Additionally, or alternatively, the UEs 305 may synchronize timing of transmission time intervals (e.g., frames, subframes, slots, and/or the like) using global navigation satellite system (GNSS) timing. The UEs 305 may transmit V2X communications using the sidelink channel 310.

In some aspects, V2X transmissions may be one-to-many broadcast and/or multicast transmissions. In some aspects, V2X transmissions may not require any physical layer feedback from receiving devices, such as acknowledgement (ACK) or negative acknowledgement (NACK) feedback. In some aspects, V2X transmissions may be configured without retransmission. In some aspects, V2X transmissions may be configured with a small number of retransmissions (e.g., one retransmission) that always occur (e.g., without ACK/NACK feedback).

As further shown in FIG. 3, the sidelink channel 310 may include a physical sidelink control channel (PSCCH) 315 and a physical sidelink shared channel (PSSCH) 320. The PSCCH 315 may be used to communicate control information, similar to a physical downlink control channel (PDCCH) and/or a physical uplink control channel (PUCCH) used for communications with a base station 110. The PSSCH 320 may be used to communicate data, similar to a physical downlink shared channel (PDSCH) and/or a physical uplink shared channel (PUSCH) used for communications with a base station 110. For example, the PSCCH 315 may carry sidelink control information (SCI) 325, which may indicate various control information used for sidelink communications, such as one or more resources (e.g., time, frequency, and/or beam resources) where a transport block (TB) 330 that includes data is carried on the PSSCH 320 and/or other control information that may be used to assist in receiving, decoding, and/or demodulating data carried via the PSSCH 320. The TB 330 may include V2X data, such as a basic safety message (BSM), a traffic information message (TIM), a signal phase and time (SPAT) message, a MAP message to convey geographic road information, a cooperative awareness message (CAM), a distributed environment notification message (DENM), an in-vehicle information (IVI) message, and/or the like. In some aspects, the V2X data may include data relevant to operation of a vehicle associated with a UE 305.

In some aspects, the sidelink channel 310 may use resource pools. For example, a scheduling assignment (e.g., included in SCI 325) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using transmission mode 4, where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of V2X communications based at least in part on the measurement(s).

Additionally, or alternatively, the UE 305 may perform resource selection and/or scheduling using SCI 325 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In V2X communication systems, a UE 305 may blindly decode SCIs 325 at the beginning of each subchannel of the PSCCH 315, or may arbitrarily or randomly determine SCIs 325 to be initially decoded. Due to the volume of network traffic in the V2X communication system, this may cause more important transmissions (e.g., from a large vehicle that is quickly approaching or swerving, from a vehicle in a blind spot, and/or the like) to be dropped in favor of less important transmissions (e.g., from a vehicle on the opposite side of a divided highway, from a vehicle that is far away, and/or the like) due to processing and power constraints of a UE 305 receiving the transmissions.

Some techniques and apparatuses described herein improve performance of V2X communication systems by permitting a UE 305 associated with a host vehicle to determine threat metrics for V2X traffic received from UEs 305 associated with remote vehicles and prioritize processing of SCIs 325 and corresponding TBs 330 based at least in part on the threat metrics. In this way, the UE 305 of the host vehicle may process more important V2X traffic earlier and/or more often than less important V2X traffic, which increases safety and improves performance and power consumption when the UE 305 of the host vehicle is resource-constrained.

As indicated above, FIG. 3 is provided merely as an example. Other examples are possible and may differ from what was described with regard to FIG. 3.

Figure 4:
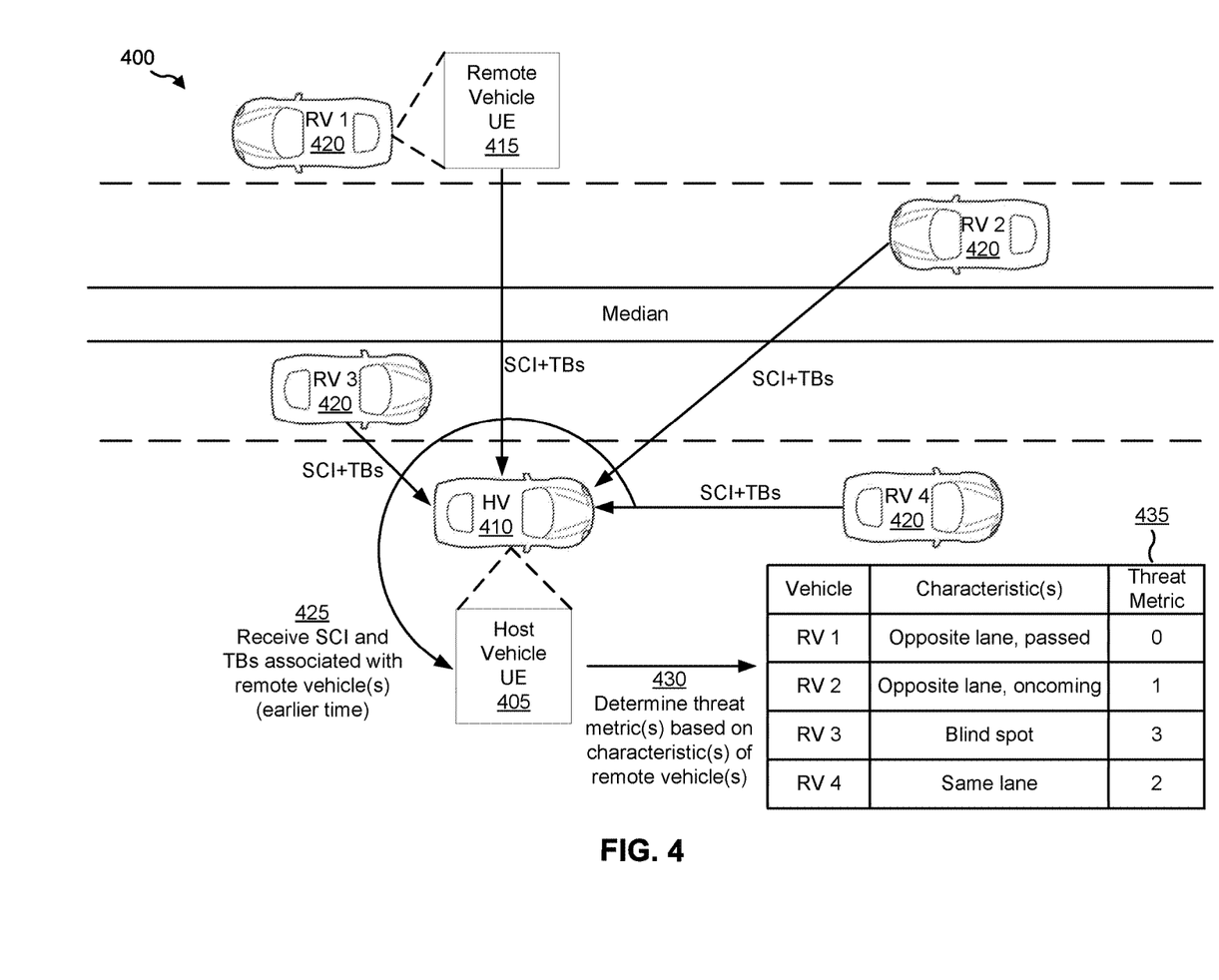
FIGS. 4 and 5 are diagrams illustrating examples of prioritizing V2X communication messages based at least in part on threat level estimation, in accordance with various aspects of the present disclosure.

FIG. 4 is a diagram illustrating an example 400 of prioritizing V2X communication messages based at least in part on threat level estimation, in accordance with various aspects of the present disclosure.

As shown in FIG. 4, a host vehicle UE 405 may be associated with a host vehicle 410, and one or more remote vehicle UEs 415 may be associated with a corresponding one or more remote vehicles 420. In some aspects, the host vehicle UE 405 and/or the remote vehicle UE(s) 415 may correspond to one or more UEs described elsewhere herein, such as UE 120, UE 305, and/or the like. In some aspects, a UE 405, 415 may be integrated into a vehicle 410, 420, may be located in or on the vehicle 410, 420, may be the vehicle 410, 420, and/or the like. A vehicle 410, 420 may include an autonomous vehicle, a semi-autonomous vehicle, a non-autonomous vehicle, and/or the like. In some aspects, a vehicle may include a car, a truck, a van, a bus, an aircraft, a drone, a bicycle, a pedestrian, a robot, and/or the like. In some aspects, a vehicle may be referred to more broadly as an object (e.g., a remote object, a host object, and/or the like). Although UEs 405, 415 in FIG. 4 are shown as being associated with vehicles 410, 420, in some aspects, one or more of the UEs 405, 415 may not be associated with a vehicle 410, 420. For example, a UE 405, 415 may be associated with infrastructure (e.g., traffic infrastructure, such as a traffic signal, a lane signal, a sensor, a traffic controller system, and/or the like), a pedestrian (e.g., via a wearable device), and/or the like.

The host vehicle UE 405 and the remote vehicle UE(s) 415 may communicate via one or more sidelink channels 310 to exchange SCI 325 and corresponding TBs 330, as described above in connection with FIG. 3. As used herein, the terms host vehicle UE 405 and host vehicle 410 may be used to describe a UE and/or vehicle that receives and processes V2X communications (e.g., SCI and associated TBs) from one or more remote vehicle UEs 415. As used herein, the terms remote vehicle UE 415 and remote vehicle 420 may be used to describe a UE and/or vehicle from which the host vehicle UE 405 receives V2X communications. Thus, a single UE may be capable of operating as both a host vehicle UE (e.g., that receives V2X communications from other vehicles) and a remote vehicle (e.g., that transmits V2X communications to other vehicles).

As shown by reference number 425, the host vehicle UE 405 may receive SCI and corresponding TBs associated with multiple remote vehicles 420. For example, the host vehicle UE 405 may receive the SCI and the corresponding TBs from multiple remote vehicle UEs 415 corresponding to the multiple remote vehicles 420. In some aspects, the host vehicle UE 405 may receive the SCI and the corresponding TBs during a first time period, which may be earlier in time than a second time period associated with one or more operations described below in connection with FIG. 5. For example, the SCIs and TBs received during the first time period may be used to determine threat metrics associated with the remote vehicles 420, and the threat metrics may be used to prioritize processing of SCIs received during the second time period.

As shown by reference number 430, the host vehicle UE 405 may determine (e.g., calculate, compute, and/or the like) a threat metric for a remote vehicle 420 based at least in part on one or more characteristics of the remote vehicle 420. In some aspects, a threat metric may indicate a degree to which a remote vehicle 420 is a threat to the host vehicle 410, a degree to which a remote vehicle 420 should impact or influence operation of the host vehicle 410, and/or the like. For example, the threat metric may indicate a degree to which a remote vehicle 420 (or a remote object) presents a threat to the host vehicle 410 (or a host object) in a driving scenario, in a moving scenario, with respect to a potential collision between vehicles and/or objects, with respect to a potential change in operation of the host vehicle 410 due to the remote vehicle 420, with respect to a threat to the safety of a passenger of the host vehicle 410, and/or the like. Threat determination may be made due to a number of factors as discussed herein including operational characteristics or environment.

In some aspects, the host vehicle UE 405 may determine the one or more characteristics of the remote vehicle 420 based at least in part on vehicle information received in one or more transport blocks received from the remote vehicle 420. For example, a transport block received from a remote vehicle 420 may indicate a type of V2X message carried by the transport block, a location of the remote vehicle 420, a time at which the remote vehicle 420 was located at the location, a speed or velocity of the remote vehicle 420, an acceleration of the remote vehicle 420, a trajectory of the remote vehicle 420, a size of the remote vehicle 420, a driving pattern associated with the remote vehicle 420, and/or the like.

Additionally, or alternatively, the host vehicle UE 405 may infer one or more of the above characteristics based at least in part on vehicle information included in one or more transport blocks received from the remote vehicle 420. For example, the host vehicle UE 405 may infer a speed or velocity of the remote vehicle 420 by analyzing locations of the remote vehicle 420 at different times, may infer a trajectory and/or driving pattern of the remote vehicle 420 by analyzing locations and/or speeds of the remote vehicle 420 at different times, and/or the like.

In some aspects, the host vehicle UE 405 may determine a threat metric associated with a remote vehicle 420 based at least in part on a type of V2X message received from the remote vehicle 420. A type of V2X message may include, for example, a basic safety message (BSM), a traffic information message (TIM), a signal phase and time (SPAT) message, a MAP message to convey geographic road information, a cooperative awareness message (CAM), a distributed environment notification message (DENM), an in-vehicle information (IVI) message, and/or the like. In some aspects, different types of V2X messages may be associated with different priorities (e.g., a BSM and/or CAM may have a higher priority than a MAP message). Additionally, or alternatively, the transport block may indicate a priority of the V2X message (e.g., depending on the type of V2X message or independent of the type of V2X message).

In some aspects, the host vehicle UE 405 may assign a higher threat metric to a remote vehicle 420 from which a higher priority V2X message was received, and may assign a lower threat metric to a remote vehicle 420 from which a lower priority V2X message was received. As used herein, a higher threat metric may indicate a greater threat from a remote vehicle 420 and/or a greater priority for processing messages from the remote vehicle 420, and a lower threat metric may indicate a lesser threat from the remote vehicle 420 and/or a lesser priority for processing messages from the remote vehicle 420.

Additionally, or alternatively, the host vehicle UE 405 may determine a threat metric associated with a remote vehicle 420 based at least in part on a location of the remote vehicle 420. For example, the host vehicle UE 405 may assign a higher threat metric to a remote vehicle 420 located closer to the host vehicle UE 405, and may assign a lower threat metric to a remote vehicle 420 located farther from the host vehicle UE 405. Additionally, or alternatively, the host vehicle UE 405 may assign a higher threat metric to a remote vehicle 420 located in a blind spot of the host vehicle 410, and may assign a lower threat metric to a remote vehicle 420 that is not located in a blind spot of the host vehicle 410. Additionally, or alternatively, the host vehicle UE 405 may assign a higher threat metric to a remote vehicle 420 located in the same lane as the host vehicle 410, and may assign a lower threat metric to a remote vehicle 420 located in a different lane from the host vehicle 410.

Additionally, or alternatively, the host vehicle UE 405 may assign a higher threat metric to a remote vehicle 420 that is tailgating the host vehicle 410 or that is being tailgated by the host vehicle 410 (e.g., that is less than a threshold distance from the host vehicle 410 in the same lane as the host vehicle 410), and may assign a lower threat metric to a remote vehicle 420 that is not tailgating the host vehicle 410 or being tailgated by the host vehicle 410. Additionally, or alternatively, the host vehicle UE 405 may assign a higher threat metric to a remote vehicle 420 that is located in a blind intersection relative to the host vehicle 410 (e.g., that is located at an intersection that the host vehicle 410 is approaching without a direct line of sight between the host vehicle 410 and the remote vehicle 420), and may assign a lower threat metric to a remote vehicle 420 that is not located in a blind intersection relative to the host vehicle 410.

In some aspects, the host vehicle UE 405 may use map data in addition to a location to determine a threat metric associated with a remote vehicle 420. For example, if the map data indicates that a road on which the host vehicle 410 is traveling includes a median (e.g., a divider of a divided road), then a remote vehicle 420 located on the opposite side of the median from the host vehicle 410 and/or traveling in an opposite direction than the host vehicle 410 may be assigned a lower threat metric. However, if the map data indicates that a road on which the host vehicle 410 is traveling does not include a median, then a remote vehicle 420 located on the opposite side of the median from the host vehicle 410 and/or traveling in an opposite direction than the host vehicle 410 may be assigned a higher threat metric.

Additionally, or alternatively, the host vehicle UE 405 may determine a threat metric associated with a remote vehicle 420 based at least in part on a time at which the remote vehicle 420 was located at a location. For example, the host vehicle UE 405 may assign a higher threat metric to a remote vehicle 420 located in a high threat area more recently, and may assign a lower threat metric to a remote vehicle 420 located in a high threat area less recently. A high threat area may include, for example, an area close in proximity to the host vehicle 410 (e.g., within a threshold distance), a blind spot of the host vehicle 410, a same lane as the host vehicle 410, and/or the like.

Additionally, or alternatively, the host vehicle UE 405 may determine a threat metric associated with a remote vehicle 420 based at least in part on a speed or velocity of the remote vehicle 420. For example, the host vehicle UE 405 may assign a higher threat metric to a remote vehicle 420 traveling at a high speed or velocity, and may assign a lower threat metric to a remote vehicle 420 traveling at a low speed or velocity. In some aspects, the host vehicle UE 405 may assign a higher threat metric to a remote vehicle 420 traveling at a speed or velocity greater than or equal to a threshold. Additionally, or alternatively, the host vehicle UE 405 may assign a higher threat metric to a remote vehicle 420 traveling at a speed or velocity that is different from the speed or velocity of the host vehicle 410 by a threshold amount (e.g., greater than or less than the host vehicle 410 speed or velocity by a threshold amount).

Additionally, or alternatively, the host vehicle UE 405 may determine a threat metric associated with a remote vehicle 420 based at least in part on an acceleration (or negative acceleration) of the remote vehicle 420. For example, the host vehicle UE 405 may assign a higher threat metric to a remote vehicle 420 associated with a high acceleration (or deceleration), and may assign a lower threat metric to a remote vehicle 420 associated with a low acceleration (or deceleration).

Additionally, or alternatively, the host vehicle UE 405 may determine a threat metric associated with a remote vehicle 420 based at least in part on a trajectory of the remote vehicle 420. For example, the host vehicle UE 405 may assign a higher threat metric to a remote vehicle 420 associated with a trajectory that will bring the remote vehicle 420 closer to the host vehicle 410, and may assign a lower threat metric to a remote vehicle 420 with a trajectory that will not bring the remote vehicle 420 closer to the host vehicle 410. Additionally, or alternatively, the host vehicle UE 405 may assign a high threat metric to a remote vehicle 420 associated with a trajectory that will decrease a distance between the remote vehicle 420 and the host vehicle 410, may assign a medium threat metric to a remote vehicle 420 associated with a trajectory that will maintain a distance between the remote vehicle 420 and the host vehicle 410, and/or may assign a lower threat metric to a remote vehicle 420 with a trajectory that will increase a distance between the remote vehicle 420 and the host vehicle 410.

Additionally, or alternatively, the host vehicle UE 405 may determine a threat metric associated with a remote vehicle 420 based at least in part on a size of the remote vehicle 420. For example, the host vehicle UE 405 may assign a higher threat metric to a remote vehicle 420 that is larger in size, and may assign a lower threat metric to a remote vehicle 420 that is smaller in size. In some aspects, the host vehicle UE 405 may use a size of the remote vehicle 420 relative to the host vehicle 410 to determine the threat metric.

Additionally, or alternatively, the host vehicle UE 405 may determine a threat metric associated with a remote vehicle 420 based at least in part on a driving pattern of the remote vehicle 420. For example, the host vehicle UE 405 may assign a higher threat metric to a remote vehicle 420 that is associated with an abnormal or dangerous driving pattern, such as swerving, frequently or suddenly changing speed or acceleration (e.g., more than or faster than a threshold), frequently changing lanes (e.g., more than a threshold), and/or the like. Conversely, the host vehicle UE 405 may assign a lower threat metric to a remote vehicle 420 that is associated with a normal or safe driving pattern, such as maintaining a consistent speed or acceleration (e.g., within a threshold tolerance for a threshold amount of time), staying in the same lane (e.g., for a threshold amount of time), and/or the like.

Additionally, or alternatively, the host vehicle UE 405 may use sensor data, measured by one or more sensors of the host vehicle 410, to determine the threat metric. For example, a sensor of the host vehicle 410 may indicate a location of a remote vehicle 420, a time at which the remote vehicle 420 was located at the location, a speed or velocity of the remote vehicle 420, an acceleration of the remote vehicle 420, a trajectory of the remote vehicle 420, a size of the remote vehicle 420, a driving pattern associated with the remote vehicle 420, and/or the like. Sensor data may include, for example, data from a camera, a radar device, a LIDAR device, and/or the like. As an example, sensor data may indicate whether one or more lights of a vehicle are on or off, and the host vehicle UE 405 may assign a lower threat metric to a remote vehicle 420 with all lights on, may assign a medium threat metric to a remote vehicle 420 with one light off, may assign a higher threat metric to a remote vehicle 420 with all lights off, and/or the like.

In some aspects, the host vehicle UE 405 may determine a threat metric associated with a remote vehicle 420 based at least in part on multiple characteristics described above. Additionally, or alternatively, the host vehicle UE 405 may assign weights to characteristics, and may determine the threat metric based at least in part on assigning the weights to the characteristics.

As shown by reference number 435, the host vehicle UE 405 may store an indication of an associated between a remote vehicle 420 and a threat metric determined for the remote vehicle 420. In some aspects, SCI and/or a TB received from a remote vehicle 420 may include a vehicle identifier that identifies the remote vehicle 420. In this case, the host vehicle UE 405 may store the vehicle identifier of the remote vehicle 420, a threat metric (e.g., a threat metric value) determined for the remote vehicle 420, and an indication of an association between the vehicle identifier and the threat metric. The host vehicle UE 405 may later use this stored indication to identify a threat metric associated with the remote vehicle 420 using a vehicle identifier included in SCI received from the remote vehicle 420 at a later time, as described below in connection with FIG. 5. The host vehicle UE 405 may process this later-received SCI based at least in part on the threat metric, thereby increasing safety and improving performance by processing more important V2X traffic earlier and/or more often than less important V2X traffic.

As an example, and as shown in FIG. 4, the host vehicle UE 405 may determine that a first remote vehicle 420, identified as RV 1, is to be associated with a threat metric of 0 because the first remote vehicle 420 is located in an opposite lane from the host vehicle 410 (e.g., across a median) and has passed the host vehicle 410. As another example, the host vehicle UE 405 may determine that a second remote vehicle 420, identified as RV 2, is to be associated with a threat metric of 1 because the second remote vehicle 420 is located in an opposite lane from the host vehicle 410 but has not yet passed the host vehicle 410 (e.g., is oncoming).

As another example, the host vehicle UE 405 may determine that a third remote vehicle 420, identified as RV 3, is to be associated with a threat metric of 3 because the third remote vehicle 420 is located in a blind spot of the host vehicle 410. As another example, the host vehicle UE 405 may determine that a fourth remote vehicle 420, identified as RV 4, is to be associated with a threat metric of 2 because the fourth remote vehicle 420 is located in a same lane as the host vehicle 410. In this case, RV 3 represents the highest threat, RV 4 represents the second-highest threat, RV 2 represents the second-lowest threat, and RV 1 represents the lowest threat. While each threat metric in FIG. 4 is shown as having a different value, in some aspects, two or more threat metrics of different remote vehicles 420 may have the same value.

In some aspects, the host vehicle UE 405 may update a threat metric associated with a remote vehicle 420. For example, the host vehicle UE 405 may periodically update the threat metric value so that the threat metric values are updated to reflect current and dynamic traffic conditions. Additionally, or alternatively, the host vehicle 405 may update the threat metric based at least in part on receiving additional SCI and/or TBs from the remote vehicle 420, other remote vehicles 420, infrastructure, and/or the like. For example, the host vehicle UE 405 may modify the threat metric (e.g., a value of the threat metric) based at least in part on determining that one or more characteristics of the remote vehicle 420 has changed (e.g., by a threshold amount). In some aspects, the host vehicle UE 405 may remove (e.g., delete) a threat metric for a remote vehicle 420 based at least in part determining that the remote vehicle 420 is no longer within communicative proximity of the host vehicle UE 405.

As indicated above, FIG. 4 is provided merely as an example. Other examples are possible and may differ from what was described with regard to FIG. 4.

Figure 5:
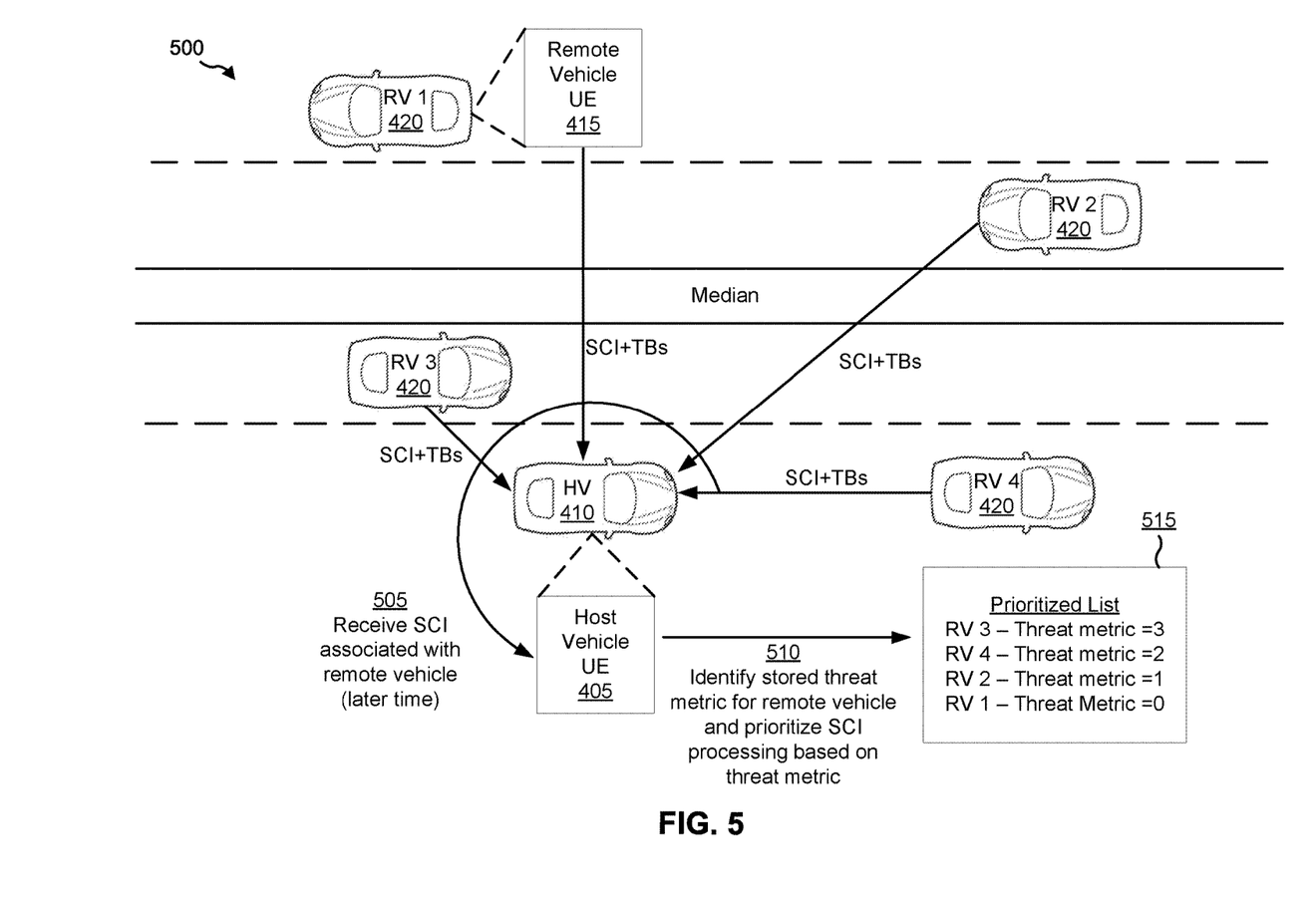

FIG. 5 is a diagram illustrating another example 500 of prioritizing V2X communication messages based at least in part on threat level estimation, in accordance with various aspects of the present disclosure.

As shown by reference number 505, a host vehicle UE 405 (e.g., described above in connection with FIG. 4) may receive SCI associated with a remote vehicle 420. In some aspects, the host vehicle UE 405 may receive the SCI during a second time period, which may be later in time than a first time period during which prior SCI was received by the host vehicle UE 405. As described above in connection with FIG. 4, the host vehicle UE 405 may use the prior SCI and one or more corresponding TBs received from the remote vehicle 420 to determine a threat metric associated with the remote vehicle 420.

As shown by reference number 510, the host vehicle UE 405 may identify a threat metric associated with the remote vehicle 420, and may prioritize processing of the SCI (and/or one or more corresponding TBs) based at least in part on the threat metric. As described above in connection with FIG. 4, the threat metric may be determined based at least in part on one or more characteristics of the remote vehicle 420, and the one or more characteristics may be determined based at least in part on vehicle information received in one or more transport blocks corresponding to the prior SCI associated with the remote vehicle 420.

In some aspects, the prior SCI (e.g., received during the first time period) may include a vehicle identifier of the remote vehicle 420, and the host vehicle UE 405 may store an indication of an association between the vehicle identifier and the threat metric determine for the remote vehicle 420. The SCI received during the second time period may include the same vehicle identifier, and may be used by the host vehicle UE 405 to identify (e.g., look up) the threat metric for the remote vehicle 420.

In some aspects, the host vehicle UE 405 may process the SCI based at least in part on the threat metric. For example, the host vehicle UE 405 may prioritize processing of the SCI based at least in part on the threat metric. In this case, SCI associated with a higher threat metric may receive a higher priority for processing relative to SCI associated with a lower threat metric. In some aspects, the host vehicle UE 405 may determine a rate at which SCI is processed based at least in part on a threat metric associated with the SCI. For example, SCI associated with a higher threat metric may be processed at a higher rate (e.g., more frequently) relative to SCI associated with a lower threat metric.

Additionally, or alternatively, the host vehicle UE 405 may schedule SCI for processing at a particular time (e.g., within a particular time period, in a particular slot, and/or the like) based at least in part on the threat metric. In some aspects, SCI associated with a higher threat metric may be scheduled for processing sooner than SCI associated with a lower threat metric. Additionally, or alternatively, the host vehicle UE 405 may use a semi-persistent scheduling (SPS) periodicity, associated with the SCI, to determine a particular time for processing the SCI.

In some aspects, the host vehicle UE 405 may use one or more characteristics of a remote vehicle 420 to determine a particular time when SCI, associated with the remote vehicle 420, is to be processed. For example, the host vehicle UE 405 may use a distance between the host vehicle 410 and the remote vehicle 420 and/or a speed of the host vehicle 410 and/or the remote vehicle 420 to determine an expected time when the host vehicle 410 and the remote vehicle 420 will be a threshold distance apart. The host vehicle UE 405 may schedule processing of SCI received from the remote vehicle 420 such that the SCI is processed when the host vehicle 410 and the remote vehicle 420 are within a threshold distance of one another.

As shown by reference number 515, in some aspects, the host vehicle UE 405 may store a list of vehicle identifiers sorted according to corresponding threat metrics. For example, the list shows RV 3 associated with a threat metric of 3, RV 4 associated with a threat metric of 2, RV 2 associated with a threat metric of 1, and RV 1 associated with a threat metric of 0. These threat metrics may be determined as described above in connection with FIG. 4. In some aspects, SCI received from remote vehicles 420 that have a higher priority in the list may be processed at a higher rate (e.g., more frequently), sooner, and/or the like as compared to SCI received from remote vehicles 420 that have a lower priority in the list. In some aspects, the host vehicle UE 405 may modify a threat metric associated with a remote vehicle 420, and may re-prioritize SCI for processing (e.g., by modifying the list) based at least in part on the modified threat metric.

In some aspects, processing the SCI may include demodulating and/or decoding the SCI, demodulating and/or decoding at least one transport block corresponding to the SCI, and/or the like. In some aspects, the host vehicle UE 405 may prevent demodulation and/or decoding of the SCI and/or the at least one transport block based at least in part on determining that a threat metric associated with the SCI is less than or equal to a threshold. In this way, the host vehicle UE 405 may increase safety and improve performance by processing more important V2X traffic earlier and/or more often than less important V2X traffic.

As indicated above, FIG. 5 is provided merely as an example. Other examples are possible and may differ from what was described with regard to FIG. 5.

Figure 6:
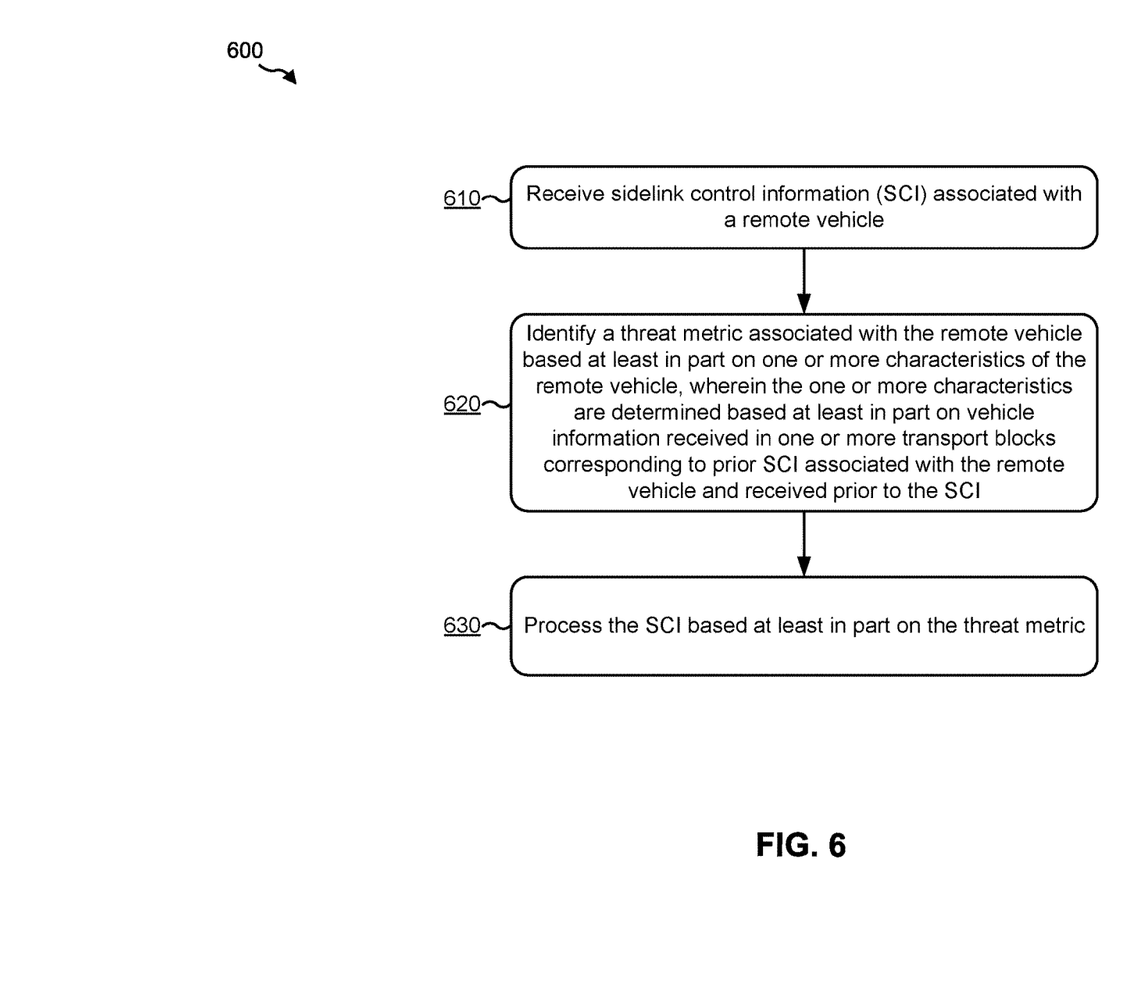
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120, UE 305, UE 405, UE 415, and/or the like) prioritizes V2X communication messages based at least in part on threat level estimation.

As shown in FIG. 6, in some aspects, process 600 may include receiving sidelink control information (SCI) associated with a remote vehicle (block 610). For example, the UE may receive SCI associated with a remote vehicle, as described above in connection with FIGS. 4 and 5.

As further shown in FIG. 6, in some aspects, process 600 may include identifying a threat metric associated with the remote vehicle based at least in part on one or more characteristics of the remote vehicle, wherein the one or more characteristics are determined based at least in part on vehicle information received in one or more transport blocks corresponding to prior SCI associated with the remote vehicle and received prior to the SCI (block 620). For example, the UE may identify a threat metric associated with the remote vehicle, as described above in connection with FIGS. 4 and 5. In some aspects, the UE may identify the threat metric based at least in part on one or more characteristics of the remote vehicle. In some aspects, the one or more characteristics are determined based at least in part on vehicle information received in one or more transport blocks corresponding to prior SCI associated with the remote vehicle. In some aspects, the prior SCI may be received prior to the SCI.

As further shown in FIG. 6, in some aspects, process 600 may include processing the SCI based at least in part on the threat metric (block 630). For example, the UE may process the SCI based at least in part on the threat metric, as described above in connection with FIGS. 4 and 5.

In some aspects, the SCI and the prior SCI both include a same vehicle identifier that identifies the remote vehicle. In some aspects, the threat metric is identified based at least in part on a stored indication of an association between the vehicle identifier and the threat metric. In some aspects, the indication of the association is stored based at least in part on analyzing the vehicle information received in the one or more transport blocks corresponding to the prior SCI.

In some aspects, the one or more characteristics include at least one of: a type of vehicle-to-everything (V2X) message received from the remote vehicle, a location of the remote vehicle, a time at which the remote vehicle was located at the location, a speed or velocity of the remote vehicle, an acceleration of the remote vehicle, a trajectory of the remote vehicle, a size of the remote vehicle, a driving pattern associated with the remote vehicle, or some combination thereof. In some aspects, the threat metric is determined based at least in part on sensor data measured in connection with the remote vehicle.

In some aspects, the SCI is processed at a rate determined based at least in part on the threat metric. In some aspects, processing of the SCI is prioritized based at least in part on the threat metric. In some aspects, the SCI is scheduled for processing at a particular time determined based at least in part on the threat metric. In some aspects, the SCI is processed based at least in part on a list of vehicle identifiers, corresponding to SCI, sorted according to corresponding threat metrics.

In some aspects, processing the SCI comprises demodulating and/or decoding the SCI and at least one transport block corresponding to the SCI. In some aspects, processing the SCI comprises preventing demodulating and/or decoding of the SCI and/or at least one transport block corresponding to the SCI. In some aspects, the UE may modify the threat metric based at least in part on a change in the one or more characteristics.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving sidelink control information (SCI) associated with a remote vehicle;
   identifying a threat metric associated with the remote vehicle based at least in part on one or more characteristics of the remote vehicle,
      wherein the threat metric indicates a degree to which the remote vehicle presents a threat to a vehicle associated with the UE, and
      wherein the one or more characteristics are determined based at least in part on vehicle information received in one or more transport blocks corresponding to previously received SCI associated with the remote vehicle and received prior to the SCI;
   processing the SCI based at least in part on the threat metric; and
   transmitting information associated with the processed SCI to influence an operation of the vehicle associated with the UE.

2. The method of claim 1, wherein the SCI and the previously received SCI both include a same vehicle identifier that identifies the remote vehicle.

3. The method of claim 2, wherein the threat metric is identified based at least in part on a stored indication of an association between the same vehicle identifier and the threat metric.

4. The method of claim 3, wherein the stored indication of the association is stored based at least in part on analyzing the vehicle information received in the one or more transport blocks corresponding to the previously received SCI.

5. The method of claim 1, wherein the one or more characteristics include at least one of:
a type of vehicle-to-everything (V2X) message received from the remote vehicle,
a location of the remote vehicle,
a time at which the remote vehicle was located at the location,
a speed or velocity of the remote vehicle,
an acceleration of the remote vehicle,
a trajectory of the remote vehicle,
a size of the remote vehicle,
a driving pattern associated with the remote vehicle, or some combination thereof.

6. The method of claim 1, wherein the threat metric is determined based at least in part on sensor data measured in connection with the remote vehicle.

7. The method of claim 1, wherein the SCI is processed at a rate determined based at least in part on the threat metric.

8. The method of claim 1, wherein processing of the SCI is prioritized based at least in part on the threat metric.

9. The method of claim 1, wherein the SCI is scheduled for processing at a particular time determined based at least in part on the threat metric.

10. The method of claim 1, wherein the SCI is processed based at least in part on a list of vehicle identifiers, corresponding to SCI, sorted according to corresponding threat metrics.

11. The method of claim 1, wherein processing the SCI comprises at least one of demodulating or decoding the SCI and at least one transport block corresponding to the SCI.

12. The method of claim 1, wherein processing the SCI comprises preventing at least one of demodulating or decoding of at least one transport block corresponding to the SCI.

13. The method of claim 1, further comprising modifying the threat metric based at least in part on a change in the one or more characteristics.

14. A user equipment (UE) for wireless communication, comprising:
memory; and
one or more processors operatively coupled to the memory, the memory and the one or more processors configured to:
receive sidelink control information (SCI) associated with a remote vehicle;
identify a threat metric associated with the remote vehicle based at least in part on one or more characteristics of the remote vehicle,
wherein the threat metric indicates a degree to which the remote vehicle presents a threat to a vehicle associated with the UE, and
wherein the one or more characteristics are determined based at least in part on vehicle information received in one or more transport blocks corresponding to previously received SCI associated with the remote vehicle and received prior to the SCI;
process the SCI based at least in part on the threat metric; and
transmit information associated with the processed SCI to influence an operation of the vehicle associated with the UE.

15. The UE of claim 14, wherein the SCI and the previously received SCI both include a same vehicle identifier that identifies the remote vehicle.

16. The UE of claim 15, wherein the threat metric is identified based at least in part on a stored indication of an association between the same vehicle identifier and the threat metric.

17. The UE of claim 16, wherein the stored indication of the association is stored based at least in part on analyzing the vehicle information received in the one or more transport blocks corresponding to the previously received SCI.

18. The UE of claim 14, wherein the one or more characteristics include at least one of:
a type of vehicle-to-everything (V2X) message received from the remote vehicle,
a location of the remote vehicle,
a time at which the remote vehicle was located at the location,
a speed or velocity of the remote vehicle,
an acceleration of the remote vehicle,
a trajectory of the remote vehicle,
a size of the remote vehicle,
a driving pattern associated with the remote vehicle, or some combination thereof.

19. The UE of claim 14, wherein the threat metric is determined based at least in part on sensor data measured in connection with the remote vehicle.

20. The UE of claim 14, wherein the SCI is processed at a rate determined based at least in part on the threat metric.

21. The UE of claim 14, wherein processing of the SCI is prioritized based at least in part on the threat metric.

22. The UE of claim 14, wherein the SCI is scheduled for processing at a particular time determined based at least in part on the threat metric.

23. The UE of claim 14, wherein the SCI is processed based at least in part on a list of vehicle identifiers, corresponding to SCI, sorted according to corresponding threat metrics.

24. The UE of claim 14, wherein processing the SCI comprises at least one of demodulating or decoding the SCI and at least one transport block corresponding to the SCI.

25. The UE of claim 14, wherein processing the SCI comprises preventing at least one of demodulating or decoding of at least one transport block corresponding to the SCI.

26. The UE of claim 14, further comprising modifying the threat metric based at least in part on a change in the one or more characteristics.

27. A non-transitory computer-readable medium storing instructions for wireless communication, the instructions comprising:
one or more instructions that, when executed by one or more processors of a user equipment (UE), cause the one or more processors to:
receive sidelink control information (SCI) associated with a remote vehicle;
identify a threat metric associated with the remote vehicle based at least in part on one or more characteristics of the remote vehicle,
wherein the threat metric indicates a degree to which the remote vehicle presents a threat to a vehicle associated with the UE, and
wherein the one or more characteristics are determined based at least in part on vehicle information received in one or more transport blocks corresponding to previously received SCI associated with the remote vehicle and received prior to the SCI;
process the SCI based at least in part on the threat metric; and transmit information associated with the processed SCI to influence an operation of the vehicle associated with the UE.

28. The non-transitory computer-readable medium of claim 27, wherein the one or more characteristics include at least one of:
- a type of vehicle-to-everything (V2X) message received from the remote vehicle,
- a location of the remote vehicle,
- a time at which the remote vehicle was located at the location,
- a speed or velocity of the remote vehicle,
- an acceleration of the remote vehicle,
- a trajectory of the remote vehicle,
- a size of the remote vehicle,
- a driving pattern associated with the remote vehicle, or some combination thereof.

29. An apparatus for wireless communication, comprising:
- means for receiving sidelink control information (SCI) associated with a remote vehicle;
- means for identifying a threat metric associated with the remote vehicle based at least in part on one or more characteristics of the remote vehicle,
  - wherein the threat metric indicates a degree to which the remote vehicle presents a threat to a host vehicle, and
  - wherein the one or more characteristics are determined based at least in part on vehicle information received in one or more transport blocks corresponding to previously received SCI associated with the remote vehicle and received prior to the SCI;
- means for processing the SCI based at least in part on the threat metric; and
- means for transmitting information associated with the processed SCI to influence an operation of the host vehicle.

30. The apparatus of claim 29, wherein the one or more characteristics include at least one of:
- a type of vehicle-to-everything (V2X) message received from the remote vehicle,
- a location of the remote vehicle,
- a time at which the remote vehicle was located at the location,
- a speed or velocity of the remote vehicle,
- an acceleration of the remote vehicle,
- a trajectory of the remote vehicle,
- a size of the remote vehicle,
- a driving pattern associated with the remote vehicle, or some combination thereof.

* * * * *